United States Patent

[11] 3,618,714

| [72] | Inventor | Harold E. Croswell<br>Warren, Mich. |
|---|---|---|
| [21] | Appl. No. | 38,685 |
| [22] | Filed | May 19, 1970 |
| [45] | Patented | Nov. 9, 1971 |
| [73] | Assignee | General Motors Corporation<br>Detroit, Mich. |

[54] DISC BRAKE FRICTION PAD ADJUSTING DEVICE
4 Claims, 2 Drawing Figs.

[52] U.S. Cl.................................................. 188/71.8,
188/196 P, 192/111 A
[51] Int. Cl.................................................. F16d 65/52
[50] Field of Search........................................ 188/71.8,
196 P, 196 B; 192/111 A

[56] References Cited
UNITED STATES PATENTS

| 2,384,297 | 9/1945 | Goepfrich............. | 188/71.8 |
| 2,536,269 | 1/1951 | Driscoll............... | 188/71.8 |
| 3,500,966 | 3/1970 | Birge.................. | 188/72.4 |

*Primary Examiner*—George E. A. Halvosa
*Attorneys*—Frank J. Soucek and Charles R. Engle ABSTRACT: A spring steel clip is secured to an inner friction pad backing plate of a caliper disc brake assembly for movement along a modified caliper-supporting pin when the caliper piston is energized to apply the brake. The spring steel clip engages the outer surface of a bushing concentrically disposed upon the supporting pin in a one-way locking fashion whereby wear of the friction pads moves the spring clip along the outer surface of the bushing and positions the friction pad and backing plate assembly at a substantially constant clearance distance from the disc brake surface as the brake lining wears.

INVENTOR.
Harold E. Croswell
BY
C. R. Engle
ATTORNEY

DISC BRAKE FRICTION PAD ADJUSTING DEVICE

This invention relates to an automatic adjusting device for a caliper disc brake and more particularly to an improvement wherein the adjusting device is associated with a caliper-supporting pin and provides for movement in one direction only as brake lining wears to maintain a constant clearance between the friction pads and the brake disc.

Many automatic disc brake adjusting devices have been constructed heretofore in this art. Most of these devices however have incorporated a number of parts extraneous to the disc brake assembly or have necessitated specific configuration of the disc brake housing in order to accommodate the adjusting device. It is a purpose of this invention to provide a reliable automatic disc brake adjusting mechanism which is readily incorporated with a standard caliper housing wherein only slight modifications are required. Specifically the automatic adjusting device of this invention cooperates with a caliper support pin and requires only slight modification of the inner and outer caliper support members in conjunction with a slight change in the inner brake pad backing plate. A spring steel clip member is secured in the inner pad backing plate and is configured to concentrically extend over a bushing secured in the outer caliper supporting lug. The spring clip engages the outer surface of the bushing for movement in one direction only and consequently as lining wears the spring moves farther onto the bushing surface thereby providing a constant clearance between the brake pad and the brake disc surface it engages.

Accordingly among the objects of this invention is the provision of an automatic adjusting compensating for wear of the friction pads so that they are retracted to a position of constant clearance between the pad and the brake disc.

Another object of this invention is the provision of an automatic adjusting device associated with a caliper-supporting pin in a manner requiring a minimum of additional parts to provide the automatic adjustment feature.

A further object of this invention is the association of an automatic adjusting device with a disc brake caliper supporting pin wherein the pin is fixedly secured to a vehicle-supporting bracket while caliper lugs are free to slide upon the pin during application of the brakes such that the caliper automatically positions itself relative to the brake disc when the pads are engaged with the brake disc and during this movement a spring steel clip engages a bushing moving with the outer caliper lug so that the brake pads are specifically positioned relative to the brake disc prior to the next engagement of the brakes.

A still further object of this invention is the provision of a steel spring clip secured to the inner brake pad backing plate for one-way engagement with a bushing secured to the outer caliper lug whereby relative movement of the bushing within the spring steel clip rigidly positions the clip upon the outer surface of the bushing compensating for brake pad wear.

Still another object of this invention is the provision of a split spring steel clip capable of being easily removed from the inner pad backing plate when it becomes necessary to change the brake pad assemblies and consequently not interfering with replacement of the brake pads.

This invention, both as to its organization and method of operation together with further objects and advantages thereof, will be best understood by reference to the following description taken in conjunction with the accompanying drawings in which.

Figure 1:
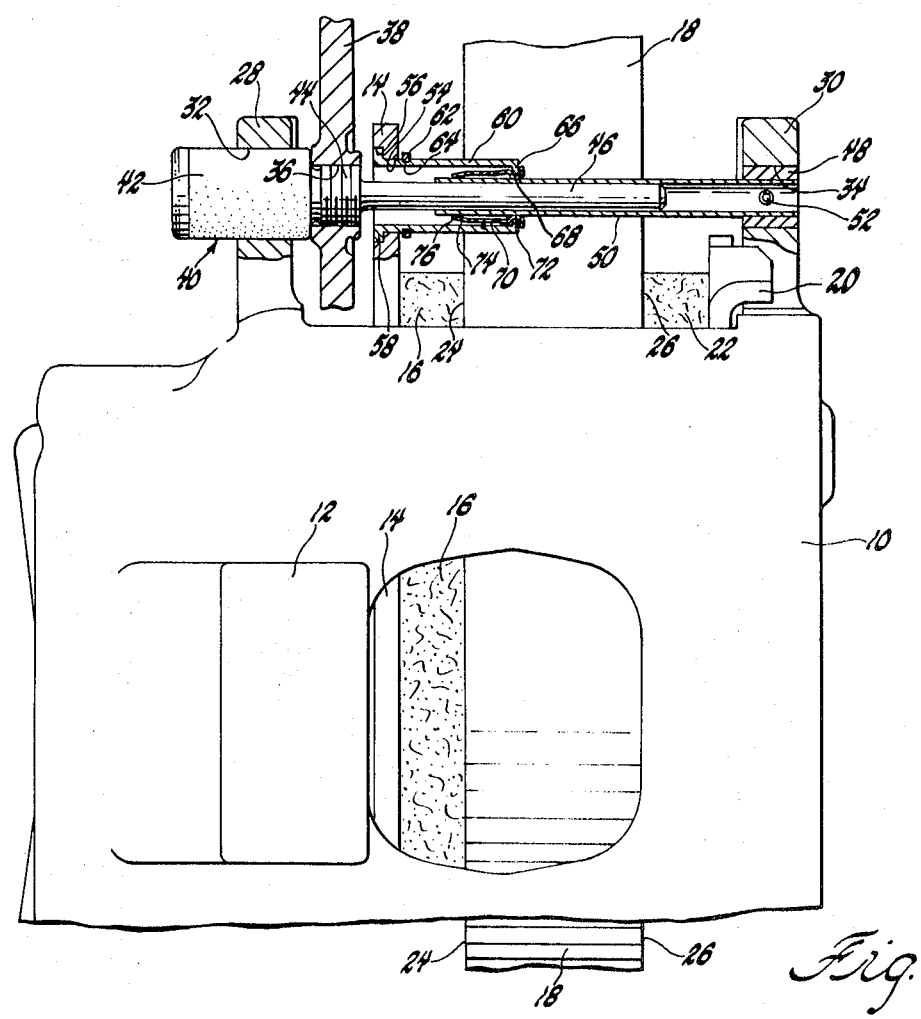
FIG. 1 is an elevational view, partly in section, illustrating a caliper disc brake assembly incorporating the automatic adjusting assembly of the subject invention.

Referring now to FIG. 1 a caliper disc brake assembly includes caliper housing 10 containing a fluid motor 12 which selectively receives pressure fluid to energize the caliper disc brake assembly. An inner brake pad supporting plate 14 is located adjacent the fluid motor 12 and has a brake pad 16 secured thereto on one side of a brake disc 18 while an outer backing plate 20 supports an outer pad 22 on an opposite side of the brake disc 18. The brake disc 18 includes side surfaces 24 and 26 respectively being engaged by the pads 16 and 22 when piston 12 is actuated by pressure fluid during application of the brakes. The caliper housing 10 includes radially extending lugs 28 and 30 disposed on either side of the brake disc 18 and containing apertures 32 and 34 that are in axial alignment with a threaded aperture 38 in a fixed mounting support 38 attached to a stationary portion of the vehicle not shown.

A caliper-supporting pin 40 includes a portion 42 received within aperture 32 of inner lug 28 and further includes a threaded portion 44 received in the threaded aperture 36 in fixed supporting member 38. The pin 40 terminates in a reduced diametrical portion 46 which extends substantially across the outer periphery of the brake disc 18.

The outer caliper-supporting lug 30 contains a mounting bushing 48 in aperture 34 mounting one end of a steel tubular bushing 50 which also extends across the outer periphery of the brake disc 18 toward the inner brake pad backing plate 14 slidably receiving portion 46 of the supporting pin 40. A pin 52 prevents rotation of the bushing 50 within mounting bushing 48.

The inner friction pad backing plate 14 contains an aperture 54 and counterbore 56, the counterbore receiving an annular shoulder 58 of a clip housing 60. The clip housing 60 is secured to the backing plate 14 by means of an annular snapring 62 engaging a groove 64 in the clip housing 60. The clip housing 60 extends concentrically over the bushing 50 and terminates in an inwardly extending flange 66 defining an aperture 68 receiving the bushing 50. A spring steel annular clip member 70 comprises a retaining groove 72 frictionally receiving the inwardly extending flange 66 of the clip housing 60 securing the clip 70 relative to bushing 50. The clip 70 is formed to engage the outer surface of bushing 50 with an angularly deformed end portion 74, the spring-biasing force of the clip 70 continually urging the portion 74 and its terminal annular rim 76 into biting engagement with the outer surface of steel bushing 50 for a purpose to be later described.

Figure 2:
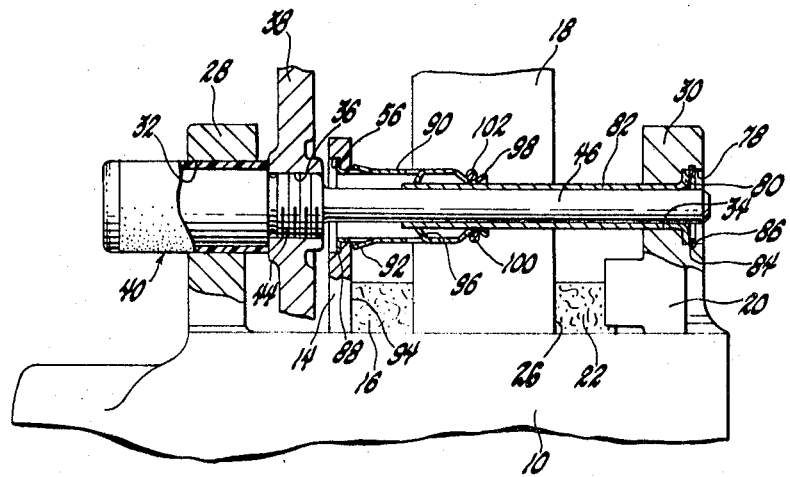
FIG. 2 is a partial elevational view illustrating a modification of the automatic adjusting assembly of the subject invention.

With reference now to FIG. 2, a modified pin-receiving bushing and spring clip arrangement is shown with a caliper assembly identical to that of FIG. 1 wherein like reference numerals refer to like parts of the assembly. The caliper-supporting pin 40 is again mounted in aperture 32 of the inner lug 28 and threadably engages the threaded aperture 36 of fixed support 38 via its threaded portion 44. And also in this structure the supporting pin 40 comprises a reduced diametrical portion 46 extending across the outer periphery of the brake disc 18.

The outer lug 30 is modified containing a counterbored aperture 78 receiving an annular flange 80 of a modified steel bushing 82 which extends across the outer periphery of brake disc 18 and slidably receives portion 46 of caliper supporting pin 40. The counterbored aperture 78 has a groove 84 receiving a snapring 86 which retains annular flange 80 of steel bushing 82 into engagement with the outer lug 30.

The counterbored aperture 56 of inner friction pad backing plate 14 receives an annular flange 88 of a split tubular spring clip 90. The tubular spring clip 90 comprises a first annulus of a plurality of struck tangs 92 that are spring biased into engagement with the outer surface 94 of backing plate 14 operating in conjunction with the annular flange 88 to secure the split tubular spring clip 90 in backing plate 14. The spring clip 90 extends concentrically over the outer surface of steel bushing 82 and comprises a second annulus of a plurality of struck tangs 96 extending inwardly and bitingly engaging the outer surface of steel bushing 82. The terminal end 98 of the spring clip 90 is necked down to form a groove 100 which receives a wire spring clip 102 continuously urging the terminal end 98 of the clip 90 into engagement with the outer surface of bushing 82. The struck tangs 96 are formed at an angle such that they continually bitingly engage the outer surface of bushing 82. With this form, the tangs 96 provide for movement of the bushing 82 into the spring clip 90 toward the backing plate 14 but prohibit movement outwardly of the spring clip 90 as the tangs tend to further engage the bushing surface when a force attempting to withdraw the bushing 82 form the clip 90 is applied.

In operation, the fluid motor 12 receives pressurized fluid and the piston contained therein engages backing plate 14 urging brake pad 16 into engagement with surface 24 of the brake disc 18. Reactive movement of the caliper housing 10 and pin 40 results in the associated engagement of friction pad 22 with surface 26 on the opposite side of the brake disc from that of the backing plate 14 and its associated pad 16. Consequently as the pads 16 and 22 wear away the piston of fluid motor 12 is required to move farther toward the brake disc 18 and consequently move backing plate 14 and the pad 16 a farther distance toward the brake disc 18. During this movement, the clip housing 60 and the associated spring clip 70 of FIG. 1 are moved farther along the outer surface of bushing 50 whereby the clip 70 is positioned establishing a constant clearance between the friction pad 16 and surface 24 of brake disc 18. During retractive movement of the piston, which is biased to a retracted position by means not shown, the backing plate 14 and the associated friction pad 16 are prevented from moving toward the inner lug 28 because of the biting engagement of spring clip annular surface 76 with the outer surface of the bushing 50. From this arrangement it is readily apparent that the spring clip 70 provides for movement in one direction only upon the outer surface of the bushing 50. It is also obvious that the configuration of the portion 74 and the annular rim 76 of the clip 70 facilitates this one-way movement toward outer lug 30 upon the outer surface of the bushing while preventing the clip from moving toward the inner lug 28 due to the continual angular engagement of the rim 76 with the bushing.

Similar results are obtained by the construction shown in FIG. 2 wherein a spring clip 90 is directly secured to the backing plate 14 thereby eliminating the clip housing. The tangs 96 of spring clip 90 are configured to engage the outer surface of bushing 82 so as to accommodate relative movement between the clip and the bushing in a direction toward outer lug 30 while preventing movement of the clip relative to the bushing 82 toward inner lug 28. Of course the angle of the tangs 96 relative to the bushing 82 can be varied to obtain various degrees of engagement therebetween.

In both of the embodiments shown in FIGS. 1 and 2 the clip housing 60 of FIG. 1 and the spring clip 90 of FIG. 2 can both be provided with a longitudinal slit allowing for contraction of the cylindrical members to accommodate removal from the backing plate 14. Subsequent axial movement of the housing 60 or the clip 90 and expansion thereof accomplishes easy removal of these members from the exterior of the bushing 50 or the bushing 82. However it is possible to leave the clip housing 60 or the bushing 90 located upon the bushing 82 while an inner backing plate and friction pad 16 is being removed and replaced whereupon installation of a new assembly, the housing 60 or the clip 90 is merely reexpanded and moved axially along the bushing outer surface until it is again reinserted in the aperture 56 in the plate 14. It is apparent that this structural arrangement provides for withdrawal or replacement of the backing plate 14 and friction pad 16 without damaging or destroying the clip housing 60 in FIG. 1 or the spring clip 90 in FIG. 2.

The above-described invention simply and reliably provides an automatic brake wear adjusting device which requires a minimum of additional components. It is only necessary to slightly modify a caliper-supporting pin and the caliper lugs which receive the pin to support the assembly in relation to a fixed member such as the mounting bracket 38 that is in turn secured to a fixed portion of the vehicle. A countersunk aperture is required in the inner backing plate 14 to receive and support either the clip housing 60 or the spring clip 90 in FIG. 2, and finally a steel bushing is secured in an aperture in the outer lug 30 of the caliper 10 whereby the bushing extends toward the inner backing plate 14 and slidably receives a portion of the caliper-supporting pin 40.

From the above description wherein preferred embodiments of the invention are shown for purposes of illustration only it is apparent that many other modifications may be utilized and still come within the scope of the invention as defined by the following appended claims.

What I claim is:

1. In a vehicle disc brake assembly including a brake disc rotating with a vehicle wheel; a caliper; a pair of mounting lugs on said caliper, one extending on the vehicle inner side of said brake disc, the other extending on the vehicle outer side of said brake disc; a caliper-mounting bracket secured to the vehicle and extending between said lugs; a support pin mounted in said lugs and fixedly secured in said mounting bracket; a bushing secured in said outer caliper lug and having a terminal end extending toward said inner caliper lug concentrically about said pin; an inner friction pad and backing plate assembly; a spring clip secured to said inner friction pad backing plate and being concentrically disposed over the terminal end of said bushing; and a plurality of tangs struck from said spring clip angularly disposed to engage the outer surface of said bushing; said angular tangs providing for movement of said clip toward said outer caliper lug and bitingly engaging the outer surface of said bushing preventing movement of said bushing outwardly relatively to said spring clip whereby said spring clip is positioned upon the outer surface of said bushing maintaining a constant clearance between the inner friction pad and said brake disc when the brakes are applied and the friction pad wears away.

2. In a vehicle disc brake assembly including a brake disc rotating with a vehicle wheel; a caliper housing; a pair of mounting lugs on said caliper housing, one extending on the vehicle inner side of said brake disc, the other extending on the vehicle outer side of said brake disc; a caliper-mounting bracket secured to the vehicle and extending between said lugs; a support pin mounted in said lugs and removably attached to said mounting bracket; said outer caliper lug containing an aperture; a cylindrical bushing having one end mounted within said outer lug aperture; a pin securing said bushing and said outer caliper lug; said bushing extending toward said inner caliper lug; an inner friction pad and backing plate assembly positioned between said brake disc and said inner caliper lug; said inner friction pad backing plate containing an aperture therein; a clip housing member secured in said inner backing plate aperture and extending toward said outer caliper lug; said clip housing terminating in an inwardly extending flange containing an aperture receiving said bushing; and a spring clip secured to said inwardly extending flange and extending toward said inner caliper lug within said clip housing; said spring clip terminating in an annular rim continually spring biased into engagement with the outer surface of said bushing and having a configuration providing for movement of said bushing within said clip housing toward said inner lug while preventing withdrawal movement of said bushing from said clip housing thereby maintaining a constant clearance between said inner friction pad and said brake disc as the brakes are applied and the friction pad wears away.

3. An automatic vehicle disc brake adjusting mechanism wherein a disc brake assembly includes a brake disc rotating with a vehicle wheel; a disc brake caliper comprising a pair of mounting lugs, one extending on the vehicle inner side of said brake disc, the other extending on the vehicle outer side of said brake disc; a caliper-mounting bracket fixed to the vehicle and extending between said lugs; a support pin mounted in said lugs and fixedly secured to said mounting bracket; a bushing secured in said outer caliper lug and extending toward said inner caliper lug concentrically about said pin; an inner friction pad and backing plate assembly; and a spring clip secured to said inner brake pad backing plate and having a portion in slidable engagement with a surface of said bushing, said spring clip being configured to engage said bushing surface for relative movement therebetween in one direction only whereby engagement with said brake disc and consequent wear of said inner brake pad causes said spring clip to be moved on said bushing maintaining a constant clearance between said pad and said brake disc, said spring clip preventing movement of said pad away from said disc by its engagement with said bushing surface.

4. In a vehicle disc brake assembly including a caliper housing, a brake disc rotating with a vehicle wheel and having an inner side surface facing toward the vehicle and an outer side surface facing away from the vehicle, inner and outer friction pad and backing plate assemblies each being mounted in said caliper housing on the respective inner and outer sides of said brake disc, a fluid motor in said caliper housing selectively receiving pressure fluid moving said inner backing plate and friction pad assembly toward said brake disc and engaging the friction pad with the inner side thereof, reactive movement of said caliper likewise moving said outer backing plate and friction pad assembly engaging the outer friction pad with the outer side surface of said brake disc, said fluid motor and said inner and outer friction pads and supporting plate assemblies being biased to a retracted position when pressure fluid is not being supplied to said piston, inner and outer supporting lugs extending from the caliper housing on each side of said brake disc, a mounting bracket fixedly secured to the vehicle and extending between the inner supporting lug and the inner friction pad supporting plate, a caliper-supporting pin secured in said mounting bracket and having portions axially extending into apertures in said inner and outer caliper-supporting lugs across the outer periphery of the brake disc, the improvement comprising: a bushing secured in said outer caliper supporting lug and extending toward said inner friction pad backing plate across the outer periphery of the brake disc, a reduced diametrical portion of said supporting pin slidably received within said bushing, a cylindrical spring clip secured in an aperture in said inner friction pad backing plate extending oppositely to and concentrically over said bushing, a plurality of angularly extending tangs struck from said clip and engaging the outer surface of said bushing permitting movement of said inner friction pad and backing plate assembly toward said brake disc, said tangs preventing movement of said inner friction pad and backing plate assembly in a direction away from said brake disc thereby maintaining a constant clearance therebetween as the friction pad wears, and a wire spring concentrically disposed over said cylindrical spring clip biasing the angularly struck tangs into frictional engagement with the outer surface of said bushing.

* * * * *